March 9, 1937.   O. MALCHER   2,073,162
COMPUTING SCALE
Filed March 17, 1932   7 Sheets-Sheet 1

Inventor
Otto Malcher

March 9, 1937. O. MALCHER 2,073,162
COMPUTING SCALE
Filed March 17, 1932 7 Sheets-Sheet 2

Fig. 3

March 9, 1937.　　　　O. MALCHER　　　　2,073,162
COMPUTING SCALE
Filed March 17, 1932　　　　7 Sheets-Sheet 5

March 9, 1937.　　　　O. MALCHER　　　　2,073,162
COMPUTING SCALE
Filed March 17, 1932　　　7 Sheets-Sheet 6

Patented Mar. 9, 1937

2,073,162

UNITED STATES PATENT OFFICE 2,073,162

COMPUTING SCALE

Otto Malcher, Chicago, Ill.

Application March 17, 1932, Serial No. 599,471

21 Claims. (Cl. 235—58)

This application is a continuation in part of my application Serial No. 388,050, filed August 24, 1929, and the invention relates in general to a computing scale for use in connection with a weight machine and has more particular relation to an indicator for designating the money value of a weighed article of which the price per pound is given.

One of the principal objects of the invention is in the provision of a visible scale which may be seen on opposite sides, by the buyer and seller, respectively, giving the notations of the weight, the price per pound and the money value.

A further object of the invention is in simplifying the mechanism for recording the money value when the price per pound is given and the weight determined by a suitable weighing mechanism.

A still further object of the invention is in the provision of one chart or series of values which is utilized for all registrations of the different money values corresponding to the price per pound and the weight, within the limits of the scale.

A further object of the invention is in the provision of a money value indicating chart which is held in the last position until the chart is again used for indicating the next money value.

A still further object of the invention is in the provision of means for accurately setting the price per pound for any given value and utilizing the variation of a weighing scale, for example, to obtain a money value corresponding thereto without lost motion, and therefore accurately, within the limits of the scale.

A further object of the invention is in the provision of showing the money value in large figures by dividing the money value chart into tens and units graduations.

A further important object of the invention is in the provision of means for effecting the showing of each full ten cent value or a multiple thereof provided that the units indicate more than nine and one-half units immediately preceding it.

A further important object of the invention is in the provision of means for accurately moving the money value mechanism the full distance to indicate the proper amount, then causing a reverse movement of the indicating mechanism to the closest 10-cent value and by this reverse movement causing a corresponding movement of a units indicator determined by the amount of the reverse movement of the next lower 10-value, and permitting a resumption of the full 10-value if a predetermined amount more than nine units is indicated.

Other mechanical objects of the invention will appear hereinafter, such for example, as the provision of clutch and release mechanism for the money value chart and to lock the weighing scale in position; to accurately position the price per pound scale; to automatically position a stop in the path of a movable scale weighing member; to automatically return part of the shifting mechanism in place allowing another part to return to actuating position; to provide simple spring and cam actuated mechanisms for moving the parts positively, accurately and without lost motion; and in general to provide the mechanism herein shown and described. For accomplishing these results and others which will appear hereinafter, the accompanying drawings illustrate a preferred embodiment of the invention.

Computing scales for showing the weight, money value, and price per pound are not entirely new but the present invention differs from other scales of this kind in showing these three different records in duplicate and on opposite sides of the machine so that they are clearly visible both to the buyer and to the seller. Furthermore in the present machine these separate indications appear on the same tape, the indications for the opposite openings being reversed in position on the tape and the side openings being arranged so that the characters which are visible in any opening are those which appear only in upright position.

In many computing scales which indicate the money value and the price per pound there is a long drum upon which there is a separate series of figures for each price per pound, comprising as many complete sets of figures as there are different prices per pound. In the present computing scale there is only one set of money value figures and there is only one dial for setting the price per pound so that in reading the money value for any weight and price per pound it is not necessary to carefully examine the whole series of charts and pick out the proper one, but the proper money value will appear clearly and distinctly in the side opening, and as shown in the present chart the numerals are so enlarged at the side openings that they appear boldly and clearly so that no mistake or misunderstanding is possible.

After a money value has been obtained corresponding to any determined weight and price per pound it is an advantage to maintain the money value scale in position until the next transaction is complete. This corresponds to the registration by an ordinary cash register of the latest sale which appears at the top of the cash register until the next transaction has been registered.

Although the present invention is shown and described in connection with a weighing scale it is apparent that any registration corresponding to the money value can be obtained depending upon two variables which correspond to the weight and the price per pound. An example of a well-known use to which this scale may be put is in grocery or meat market practice where the weight of the articles sold varies, as does also the price per pound, of the different articles sold and for fractional amounts it is difficult to calculate the money value quickly and accurately. The present invention is therefore described as used in combination with a weighing scale, or with a movable element thereof which records the weight and clearly shows it upon a tape or dial entirely separate from the mechanism of the present computing scale but arranged adjacent and in alinement with the side openings of the money value and the price per pound for the sake of convenience and uniformity. The movable element of the scale mechanism must first be allowed to settle to the level determined by the weight and then the mechanism of the computing scale first grips the weighing scale mechanism and holds it in position for this weight thereby producing one of the factors of which the price per pound is the other factor for determining the money value corresponding thereto.

Figures 6, 9:
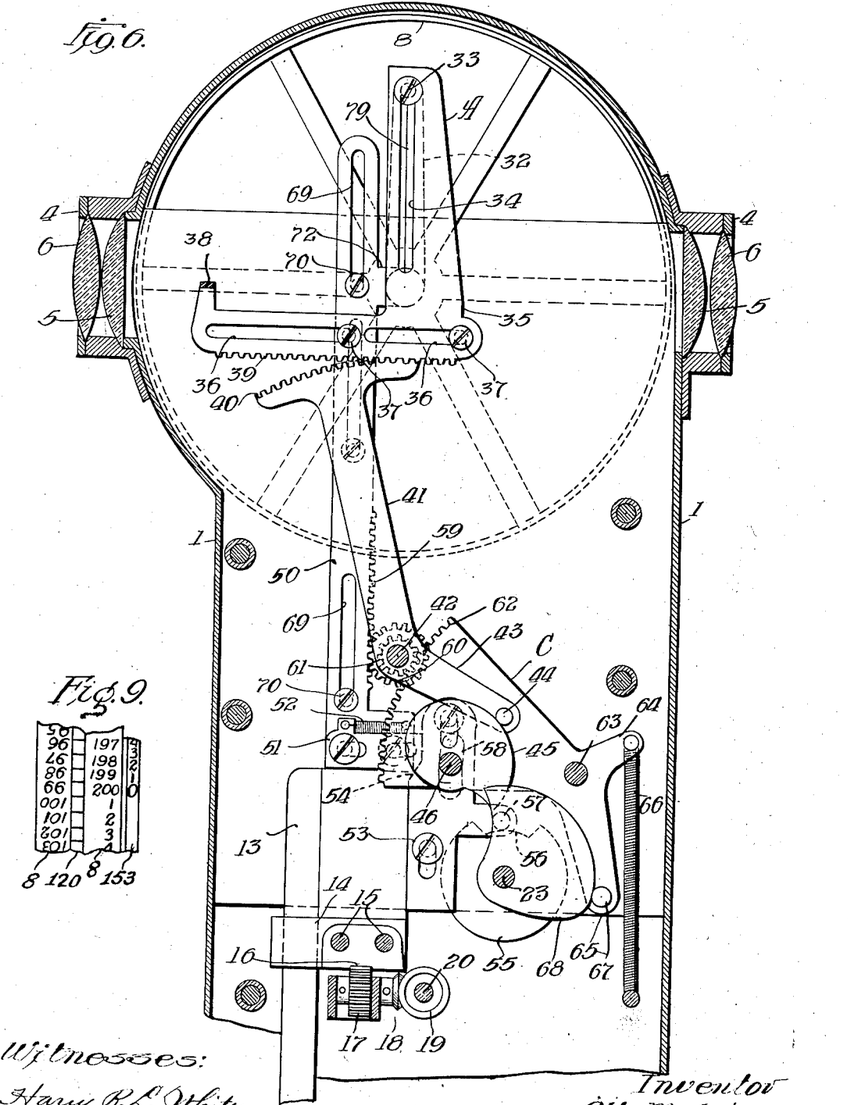
Figs. 8, 9, and 10 are fragmentary views of the weight, money value, and price per pound scales, respectively, as used in connection with the mechanism.
Figure 8:
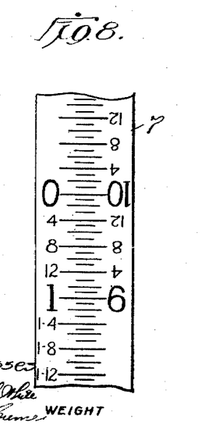
Figure 10:
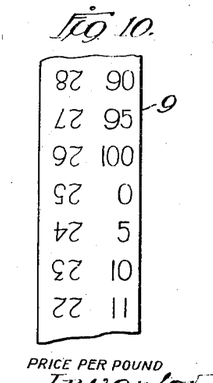

Referring now more particularly to the drawings, the computing scale comprising this invention and the weighing scale mechanism used in connection therewith are represented as enclosed in a casing designated generally with the reference numeral 1, having side openings 2, 3, and 4 adjacent the top or circular part of the casing, at both front and back in which are located lenses 5 and 6 for magnifying the figures and characters appearing upon the scales within the casing. As shown in Figs. 8, 9, and 10 there are separate scales 7 for designating the weight, 8 for designating the money value, and 9 for designating the price per pound, and each of these scales is divided longitudinally, with the graduations thereof arranged oppositely on different sides of the center line and diametrically opposite so that when applied to the wheels upon which the scales are mounted the same graduations will appear in the corresponding side openings on opposite sides of the machine, the graduations on one side of the center line being blotted out in one of the side openings and those on the other side of the center line being blotted out on the correspondingly opposite sight opening so that those remaining will be the same in upright position in the corresponding opposite openings. The price per pound variations of scale 9 are not important up to 5 and 10 pounds and usually are not increased by one cent variations until after 10 cents per pound, nor near the price of one dollar, so that the variation at these points are in 5's instead of units.

Figure 3:
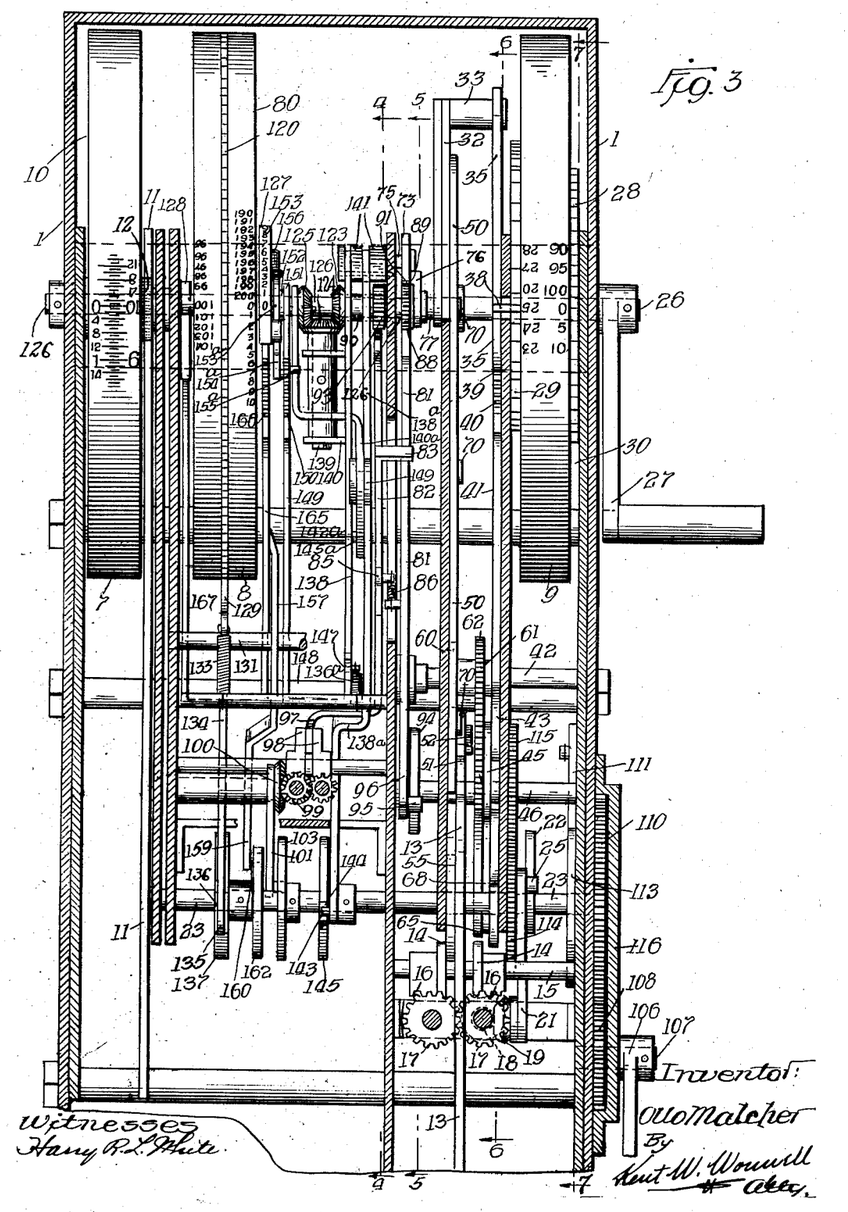
Fig. 3 is a sectional view of a scale mechanism embodying this invention as enclosed in the casing of Fig. 1.
Figure 7:
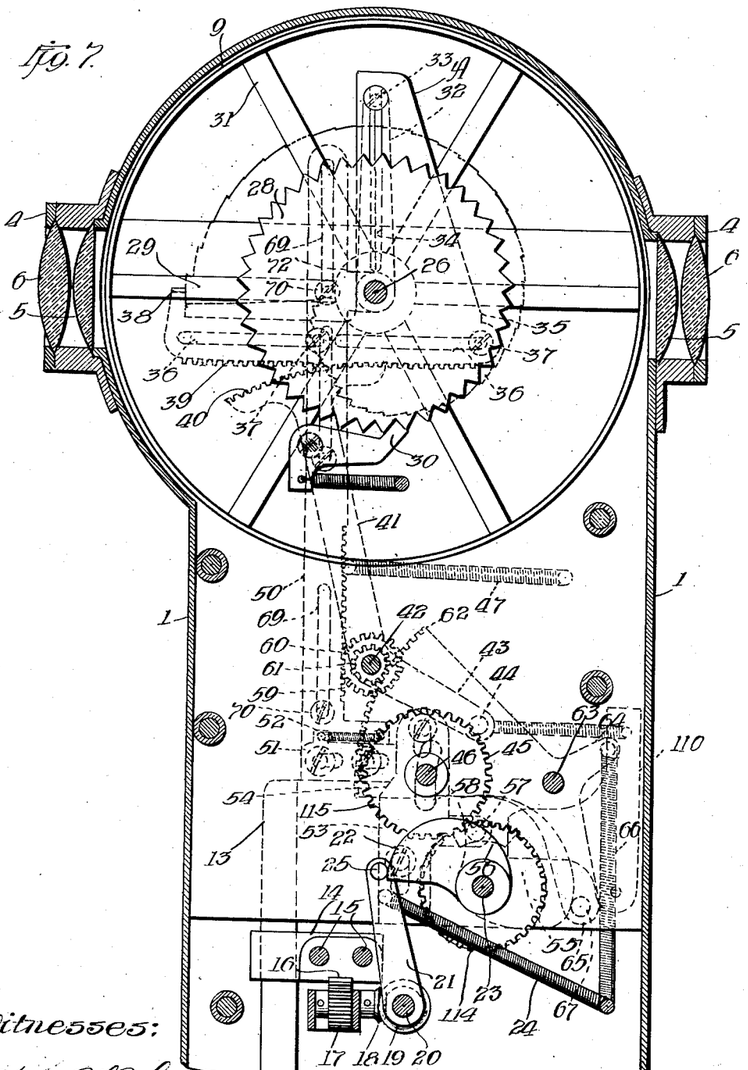

*Weight scale mechanism.*—As shown in Fig. 3 and 7, this mechanism comprises only a weight indicating scale 7 mounted upon a wheel 10 coaxial with the computing scale wheels and actuated by any suitable mechanism as for example a rack 11 and pinion 12 for moving the wheel 10 in accordance with the up and down movements of a scale mechanism and including a movable scale part 13, as shown in Fig. 7, which comes to rest at a point determined by the weight, the zero or no-weight position being shown in Fig. 7.

In accurately determining the money value, the position of this scale part 13 must be maintained after it has once come to rest and a clamp is provided comprising plates 14 movable toward and from each other on shafts 15 to clamp the member 13 therebetween, the plates having teeth 16 (see also Fig. 6) engaged by meshing pinions 17 for moving them, and the pinions being rotated by meshing gears 18 and 19, the latter being rotatable on a shaft 20 which is rocked by an arm 21 pressed in contact with a cam 22 mounted on a shaft 23, by means of a coil spring 24. As shown more clearly in Fig. 7 a slight clockwise movement of the cam 22 will free a projection 25 at the end of the arm 21 for movement by the spring, thereby actuating the lock plates 14 by the operation of the gear and pinion mechanism just described to grip the movable scale member 13 between the plates 14 and hold it in its adjusted position.

*Price per pound mechanism.*—Either after or before the weight of the article has been determined the mechanism setting the price per pound may be operated. This comprises a shaft 26 extending through the one side of the casing 1 at the outer end of which is a handle or crank 27 for rotating the shaft. Upon this shaft within the casing are discs 28 and 29 having toothed edges, the former being uniform in diameter and its teeth engaged by a spring pressed pawl 30 for engaging and holding the connected parts in an adjusted position. The other disc 29 has teeth arranged in a spiral and graduated step by step corresponding in number to the teeth of the other disc 28. The teeth of this disc 29 correspond to the price per pound graduations which appear upon the chart 9 carried by a wheel 31 for positioning the price per pound numerals in the front and rear sight openings. These prices per pound may vary as desired, increasing one cent, or more or less for each tooth of the disc 29, and the price per pound is easily set by means of the handle 27 for any price which is visible both to the buyer and to the seller as the latter adjusts it by turning the handle.

Rotation of shaft 26 by means of the handle 27 determines the angular positioning of an arm 32 (pivoted on slide 50, as subsequently explained) which has a projection 33 movable in a vertical slot 34 of a transversely slidable computing adjuster 35 having slots 36 engaged by bearing pins 37 for confining its movement to a horizontal or transverse direction. The amount that the arm 32 is inclined from its vertical position is determined by the position of adjuster 35 controlled by the disc 29. When set at zero this disc is in the position shown in Fig. 7, but by rotating the disc in a counter clockwise direction its successive value teeth are brought into the zero position where they are held by the pawl 30 and as the price per pound values increase the teeth approach more nearly to the axis of the shaft 26 so that when in the highest value the adjuster 35 will be movable the greatest distance to the right which is permitted by the slots 36 in the adjuster 35. This adjuster has a projection 38 formed at the left-hand end, as shown in Fig. 7, adapted to engage the disc 29 upon a horizontal line extending inwardly toward the shaft 26, the movement of the adjuster 35 to the right being limited by the engagement of its projection 38 with the tooth of the disc 29 which has been moved into the path of the projection 38. Thus the price per pound disc determines the transverse movement of the adjuster 35 and the angular position of arm 32.

In order to move the adjuster 35 in a horizontal direction the lower edge is formed with a rack 39 engaged by a toothed segment 40 carried upon an arm 41 pivoted on a shaft 42 and having an extension 43 on the opposite side of the shaft carrying a projection 44 adapted to engage a cam 45 mounted on shaft 46 and rotatable in a counter clockwise direction. The arm 41 is pulled toward the right, as shown in Fig. 7, by a coil spring 47 which maintains the projection 44 of the extending arm 43 in contact with cam 45 so that when this cam is partially rotated the projection 44 will move inwardly from the high point of the cam allowing the spring 47 to draw the arm 41 and with it the adjusting member 35 as far to the right as predetermined by the setting of the price per pound cam 29 which is engaged by the adjuster projection 38.

From this it will be seen that the setting of the angular position of the arm 32 is proportional to the price per pound. The money value however is determined by two factors, the price per pound times the number of pounds and the movement of the money value chart is determined both by the angular movement of the arm 32 and by the vertical movement of a slide 50 of which the movement is determined by the position of scale part 13 which has been locked in position by the clamping mechanism described.

*Weight slide movement.*—It would not do to have the weight slide 50 always in the path of movement of the scale part 13 which oscillates up and down in response to the weight of an article placed upon and removed from the scale. After the weight has been determined by the scale mechanism and the scale part 13 has come to rest and is locked in position a movable stop 51 carried at the lower end of slide 50 is moved laterally into the vertical path of scale part 13 against the tension of its returning spring 52 by means of a vertically movable cam part 53. This part 53 has a cam surface 54 for engaging one end of the stop 51 and moving the stop horizontally to the left, as shown in Figs. 6 and 7, as the cam part 53 is raised. The raising movement of the part 53 is effected by means of a cam 55 mounted on shaft 23 and having a cam recess 56 for engaging a projection 57 on the cam part 53 in such a manner that the part 53 is raised as soon as the cam 55 starts its movement and it is held in raised position until the cam 55 and the shaft 23 make one complete rotation. The cam part has a slot 58 through which shaft 46 extends to also serve as a guide for said cam.

When the scale part 13 is moved downwardly from its zero position by means of a weight, the stop 51 and the slide 50 must move downwardly a proportionate distance before the stop 51 engages the scale part 13. To effect this movement one edge of the slide is provided with a rack 59 engaged by a pinion 60 formed integral with or attached to a pinion 61 which meshes with a toothed segment 62 pivoted upon shaft 63 and having opposite arms 64 and 65. Connected to one of the arms 64 is a spring 66 which tends to draw the segment in a clockwise direction about shaft 63, as viewed in Figs. 6 and 7, and the other arm 65 carries a projection 67 adapted to engage the surface of a cam 68 mounted on shaft 23. Rotation of cam 68 in a clockwise direction with shaft 23 maintains the segment 62 in the position shown in Fig. 6 a portion of one turn of the shaft after which the projection 67 is free to move inwardly due to the action of the spring 66 and the movement of the segment causes the downward movement of the slide 50 through the pinions 60 and 61 until the stop 51 engages the scale part 13.

Vertical movement of the slide 50 is controlled and limited by one or more vertical slots 69 engaged and movable upon projections 70 connected to some fixed part of the casing or by any similar and equivalent structure which guides the movement of the slide in a vertical direction and allows no lost motion thereof.

Projecting laterally from the slide 50 near its upper end is an extension 72 to which the lower end of arm 32 is pivoted on a stub shaft normally in line with but disconnected from the price per pound adjusting shaft 26. The arm 32 is therefore first adjusted angularly by the horizontal movement of the adjuster 35 and then the arm is moved vertically downward with the slide 50 depending upon the position of the scale part 13. Thus two movements of the arm 32 are combined constituting the factors of price per pound, and weight, which determine the movement of the money value scale.

*Money value scale movement.*—An accurate movement of some member to engage the arm 32 in its position produced by the adjuster 35 and the slide 50 is necessary in order to produce an accurate movement of the money value scale for its various readings. To accomplish this result there is a money value slide 73, as shown more clearly in Fig. 5, having slots 74 for supporting it upon fixed projections 75 extending from a suitable part of the casing and guiding its movement in a horizontal direction. Carried by this slide 73 is a plate 76 supporting a stud shaft 77 having its end cut at the diameter 78 to form a recessed abutment portion at one side of the shaft and adapted to rest against a rib or projection 79 on the adjacent side of the arm 32 at the normal or zero center and axis line of the arm 32, the rib 79 terminating on the center line of the shaft 26 and the center of projection 33, as shown in Fig. 6, so that the diametric contact line 78 of the stud shaft 77 will provide a substantial contact surface for engaging the accurate positioning line 79 of the arm 32 rather than to engage the arm 79 with a sharp point on a flat surface. In other words, the stud shaft 77 rotates with the rib 79 after the arm 32 is angularly adjusted and then after the arm is moved downwardly by the slide 50, the transverse movement of the money value slide 73 brings the diametrical surface stud 78 of the stud shaft 77 into engagement with the rib 79 of the adjusting arm 32 for accurately limiting and positioning the money value slide 73 at the end of its movement against the limiting rib 79 of the adjusting arm.

The distance the slide 73 is moved to the right (in Fig. 5) determines the extent of rotation of the money value chart 8 and its carrying wheel 80. This movement is effected by means of two levers 81 and 82, the latter having an arm 83 extending into the path of movement of the other lever 81 and causing the movement together of the two levers in one direction, the levers being mounted for rotation upon the same shaft 42. These levers are provided with opposite extensions 84 and 85, respectively between which is a spring 86 tending to hold them together in contact with the projection 83. Another spring 87 is connected at one end to the lever 81 and at the other end to the casing 1 and tends to draw the two levers in a direction to move both the slide 73 and the money value wheel to their money value indicating positions.

Movement is transmitted from lever 81 to the slide 73 by means of a gear segment 88 at the outer end of the lever which meshes with a pinion 89 carried loosely on a shaft 126 and meshing with a rack 91 at the bottom of the slide 73. A corresponding movement is transmitted by a gear segment 92 at the outer end of lever 82 through a pinion 93 secured to a sleeve 90 and thereby connected to the money value wheel 80 through a differential mechanism.

Figure 4:
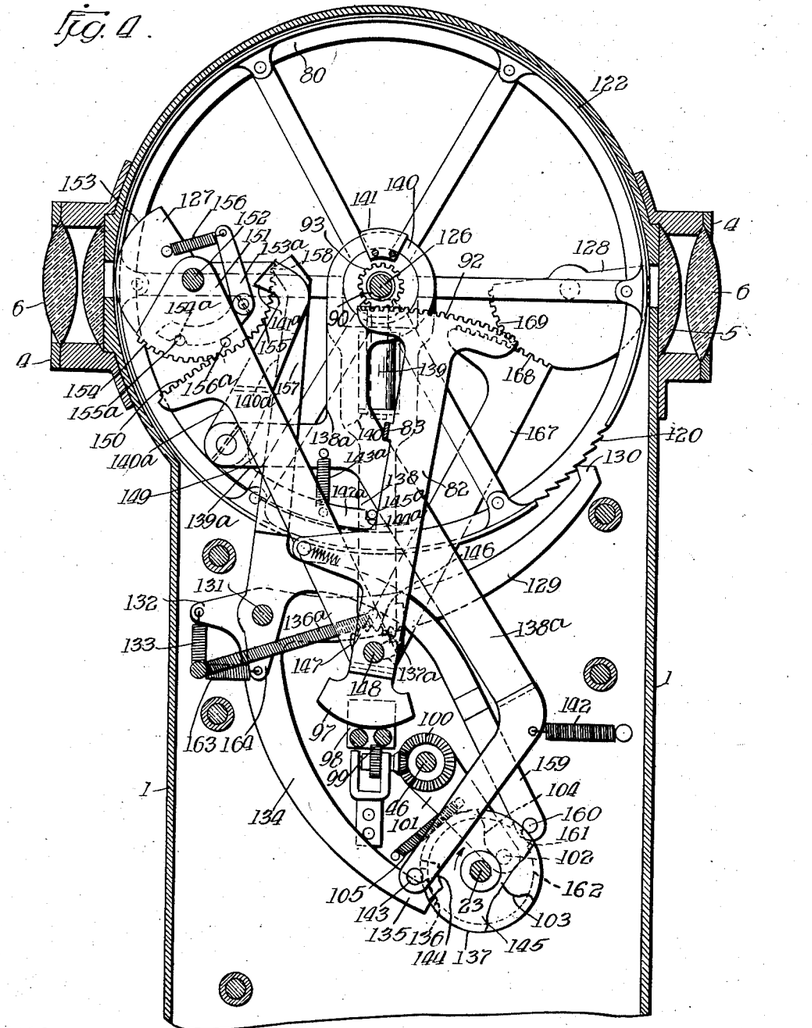
Figs. 4, 5, 6, and 7 are sectional views taken on the lines 4—4, 5—5, 6—6, and 7—7 respectively of Fig. 3.
Figure 5:
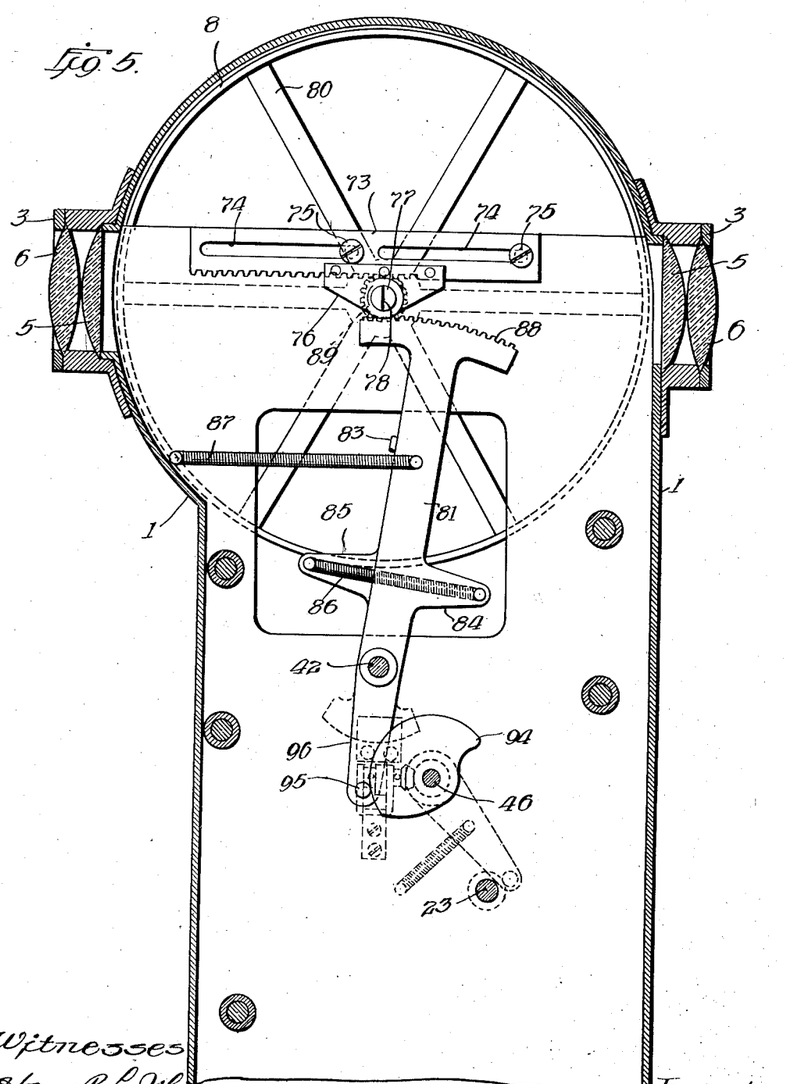

Both of the levers 81 and 82 are held normally in the positions shown by Figs. 4 and 5 and against the tension of spring 87, when the money value shown is zero, by means of a cam 94 mounted on shaft 46 adapted to engage a projection 95 on the lower end extension 96 of lever 81 so that the cam must be rotated a portion of one turn before the projection 95 will be released by the high point of the cam, allowing the spring 87 to pull both of the levers 81 and 82 to the left, thereby moving the slide 73 a distance to the right determined by the position of the arm 32 and moving the money value chart 8 a corresponding distance so that the readings thereof will be seen through the opposite sight openings 3.

At the end of lever 82 which moves the money value chart there is an extension 97 adapted to be engaged between clamping plates 98 movable toward and from each other actuated by meshing pinions 99 which are operated by a gear 100 mounted on shaft 46, the gear 100 having a connected arm 101 (see also Fig. 4) carrying a projection 102 controlled by a cam 103 mounted on shaft 23 and the projection held in a recess 104 of the cam by means of a spring 105. When the projection 102 is in the recess of the cam the clamping plates 98 engage the extension 97 and hold the lever 82 and the money value chart 8 in the last predetermined position. At this time cam 94 has been returned to its normal position, as shown in Fig. 5, and lever 81 is returned to the actuating position as shown. This leaves the money value for the last operation of the mechanism in view where it can be plainly seen both by the buyer and seller until the next transaction and actuation of the mechanism.

Thus the connection between levers 81 and 82 permits lever 82 to remain clamped in the money value indicating position, thereby holding the wheel 80 and chart 8 in this position, and permits the lever 81 to be returned by the movement of cam 94 to the position shown in Fig. 5 thereby returning the slide 73 to its normal position and extending the springs 86 and 87.

*Money value indicator refinement.*—To more accurately register the values of the money value chart and to utilize large figures for all the money values which appear through the sight openings 3, the movement imparted to the money value wheel may be utilized first to accurately set a wheel which carries only the even 10-cent values of the chart so that intermediate portions of the chart would not appear clearly and distinctly through the sight openings as the number values might overlap it slightly in either direction depending upon what intermediate value, between the 10-cent limits, actually should be registered. The 10-cent wheel is then backed off until it is stopped at the next lower 10-cent value, this reverse movement, if any, being then utilized to actuate a units wheel with unit characters which correspond in size to the tens characters and together therewith give a money value accurate to the penny, shown in large sized figures which are clearly seen.

In carrying out this feature of the invention there is a toothed portion 120 on the wheel 80 (see Figs. 3 and 4) between money value charts 121 and 122 visible through openings 3 at opposite sides of the casing, the amount of movement of this wheel being determined by the weight and the price per pound as before described. This includes the lever 82 and the driving pinion 93 which is actuated by the gear segment 92 at the outer end of the lever 82. Instead however, of being attached directly to the money value wheel 80, this pinion 93 is attached by sleeve 90 to a beveled gear 123 connected by a beveled gear 124 with a beveled gear 125 attached to the shaft 126 for operating the toothed portion 120 of the money value wheel 80. For indicating a value, let us say of twenty dollars, the chart sections 121 and 122 for this wheel 80 will have 200 graduations and numerals corresponding thereto of comparatively large size. To add ten times as many numerals to these wheels for producing an accurate cent by cent graduation would necessitate the numerals being much smaller which would make them hard to see and to distinguish from each other. By providing relatively large numerals on unit wheels 127 and 128, the unit wheels may be accurately moved into register with the adjacent portions of the charts for forming the last and concluding numeral of the money value which is of the same size and as easily readable as the tens numerals of the money value chart.

In order to effect this movement of the units wheels 127 and 128 the wheel 80 is moved by the train of gears 123, 124, and 125 to the proper position for indicating the money value, lever 82 has its extension 97 engaged by clamping plates 98, as previously described, which holds the money value mechanism in position, subject to an adjustment of the units wheel.

This adjustment is effected by means of a lever 129 having a projecting tip 130 for engaging the teeth 120 of wheel 80, the lever being pivoted upon a shaft 131 extending from a fixed portion of the frame and having an extension 132 with a spring 133 attached thereto tending to press the lever into engagement with the wheel 80 and having another extension 134 with an extremity 135 adapted to engage a notch 136 in a cam 137 rotatable on shaft 23.

With the gear 123 and its pinion 93 thus locked in position by means of lever 82 an adjusting movement of the wheel 80 is possible by a differential movement of gears 124 and 125. This movement is obtained by means of an operating lever 138 which carries the gear 124 upon a vertical shaft 139 and mounts it for swinging movement by means of a yoke 140 which swings about the center of shaft 126 and is supported in a holder 141 attached to a suitable part of the frame for permitting the swinging movement of the yoke and lever about the axis of the gear 125. This operating lever 138 is caused to swing toward the right as viewed in Fig. 4 by its operating member 138a also mounted at its upper end in holder 141 to swing about shaft 126 as an axis and having a releasable connection with lever 138 as hereafter described. A spring 142 is attached to the lower end of the member 138a and to a fixed projection and tends to move a projection 143 thereof more or less into a recess 144 of a cam 145 mounted on shaft 23 depending upon the amount which the wheel 80 moves in a reverse direction before it is stopped by the engagement of the tip 130 of lever 129 with the teeth 120 of wheel 80, which carries the 10-cent chart.

At the lower end of the lever 138 (see Figs. 3 and 4) it has teeth 146 adapted to engage corresponding teeth on a pinion 147 secured to a shaft 148. The lower end of the lever 138 has a stop piece 137a at one side adapted to engage the shaft 148 to limit its travel in one direction of movement in which it is drawn by a spring 136a attached at one end to the lever 138 and at the other to a frame projection. The two springs 142 and 136a (attached to operating member 138a) are opposed to each other and 142 is the stronger, the members 138 and 138a normally moving together. When the connection between them is released the spring 136a returns or holds the stop piece 137a against the shaft 148 until again connected automatically to its normal operating member 138a for operation therewith.

Extending from the shaft 148 is an arm 149 having a toothed segment 150 adapted to mesh with the teeth of a segment 151 pivoted on a shaft 152 which also carries the 1-cent wheel 127. The 1-cent wheel has three different portions, one portion 153 bearing unit figures corresponding to the tens figures on the adjacent chart 122 and increasing oppositely therefrom, a gear section 154, and a toothed section 155 the notches of which correspond to the numerals on the portion 153 for holding this wheel in accurate register with the chart section 122 at the sight opening.

Between the gear segment 151 and the 1-cent wheel 127 is a flexible connection comprising a lever 153a pivoted on the 1-cent wheel 127 and having a spring 156 connected between the wheel 127 and one end of the lever 153a. The other end of lever 153a has a notch 154a for engaging a pin projection 155a carried by the segment 151 and thereby holding the wheel 127 and the segment yieldingly together for a centering or adjusting movement of the 1-cent wheel without moving the gear segment 151 which is relatively fixed in position by its engagement with the tooth segment 150 of arm 149. In order to hold the 1-cent wheel accurately in place a toothed lever 157 is pivoted on shaft 131 and has a pointed end 158 engaging the teeth 155 and centering or adjusting the numerals of the wheel as it enters between the teeth 155, due to the flexible connection with the segment 151.

This lever 157 has an extension 159 with a projection 160 thereon for engaging the high point 161 of a cam 162 mounted on shaft 23 and it is normally held in engagement with the cam and pressed in a direction to disengage the point 158 from the teeth 155 by means of a spring 163 attached at one end to an extension 164 near the pivot point of the lever and at the other end to a fixed projection.

To connect the lever 138 and its operating member 138a and also to control the 1-cent wheels at times, the member 138a has an extension 139a (Figs. 3 and 4) upon which is pivoted a lever 140a with an extremity 141a located in the path of a projection 156a carried by the 1-cent wheel 127, and when it is rotated a predetermined amount to engage the extremity 141a tripping the extending other end 142a which has an engaging notch 144a from its engagement with a pin 145a projecting from lever 138.

The lever 138 and its operating member 138a normally operate together in moving the 1-cent wheels but a condition arises where the money value is between 9 and 10 cents which requires a separate movement of these parts. The teeth 155 of the 1-cent wheel are preferably pointed with equal sides so that below the central position the pointed end 158 of lever 157 will move the 1-cent wheel to the lower full cent, and engaging beyond the central point it will move the 1-cent wheel to the next full cent.

If the money value is between 9½ and 10 cents the point 130 of lever 129 will be just short of engagement with the next 10-cent value tooth 120, and in order to provide against this continuing units loss, the 1-cent wheel must be returned to 0 (zero) and the next higher 10-cent value must be restored.

In the mechanism shown this is accomplished as follows: the movement of the 1-cent wheel 127 to an indicated 9½ cent position will cause the pointed end 141a of lever 140a to be engaged by the knock-out pin 156a carried by segment 151 which will move the other end 142a of the lever out of engagement with the pin 145a, allowing the lever 138 to be rocked away from its operating member 138a by spring 136a which moves the lower end of the lever 138 until its stop member 137a contacts with shaft 148. This movement in turn rocks the pinion 147, shaft 148 and with it the arm 149, (and lever 167) to return the 1-cent wheels to 0 (zero), and through the differential gearing (123, 124, 125) to return the shaft 90 and the money value wheel 80 to the position from which they originally started approximately but not quite to the position where the next 10-cent tooth 120 is engaged by the tip 130 of lever 129 which is in fact a holding pawl, but sufficiently aligned with the sights to give a practical reading of the next 10-cent value.

To reconnect the lever 138 and its operating member 138a, the return movement of lever 138a by means of its cam 145 causes the arm 142a of lever 140a to slide along the pin 145a until the notch 144a is drawn into engagement therewith by the spring 143a.

Instead of utilizing the 10-cent restoring movement of the lever 138 to return the 1-cent wheels to zero, it is obvious that an apertured shield or cover through which the money values are visible in the sight openings might be moved one graduation of the wheel 80 which would make visible the next 10-cent value, where a money value of more than 9½ cents is obtained.

Instead of repeating this mechanism for the corresponding 1-cent wheel 128 at the opposite side of the chart there is an operating member 165 having teeth 166 in engagement with the teeth 154 of the 1-cent wheel 127 and this member extends downwardly to the shaft 148 and thence upwardly with a portion 167 at the opposite side of the money value chart portion 121 where it has teeth 168 in engagement with a toothed portion 169 of the other 1-cent wheel 128 so that the movement which is imparted to the 1-cent wheel 127 is transferred to the opposite 1-cent wheel 128.

To print the weight, money value, or price per pound, or all of them, for the purpose of supplying a ticket thus marked, requires only that the numbers be raised upon the corresponding wheels and that the sheet or ticket be pressed against them.

The succession of operation of this particular mechanism is caused by the rotation of the cam shaft 23 which first locks the lever 82 by means of the arm 101 and its cam 103; the lever 129 is raised by its cam 137 against the tension of its spring 133 until the cam recess 136 is reached which causes the tip 130 to be moved into the path of the money value wheel 120; at this time the projection 143 of lever 138a is moved by its spring 142 as far into the recess 144 of its cam 145 as determined by the counter clockwise rotation of the wheel 80 until it is stopped by engagement of the next 10-cent notch of the wheel with the tip 130, the differential movement of the gears 123, 124, and 125 permitting this reverse rotation of the wheel 80 as above explained; the movement of the lever 138a this predetermined amount causes the setting of the 1-cent wheels 127 and 128 as above described and the wheel 127 is locked in position by the lever 157 at or near the end of rotation of the cam shaft 23 because of the engagement of projection 160 of the lever 157 with the high point 161 of its cam 162, the lever 167 being normally held out of its engagement with the teeth 155 until the operation of the 1-cent wheel 127 has been completed.

Figures 1, 2:
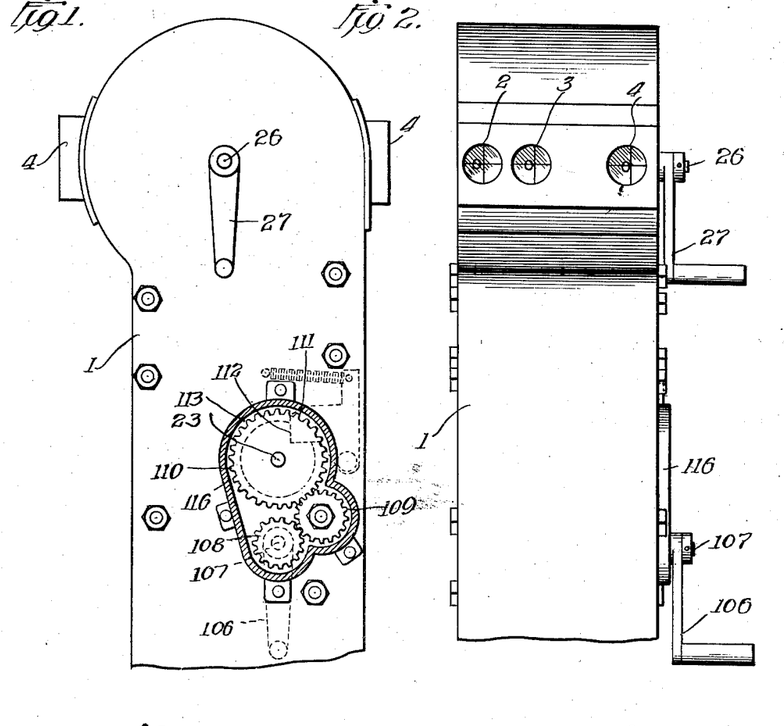
Fig. 1 is a side elevation with parts broken away illustrating a casing embodying this invention.
Fig. 2 is a view in elevation of the casing shown in Fig. 1.

*Cam-operation.*—Movement is imparted to the shafts 23 and 46 by means of a motor or mechanism located on the outside of the casing 1 as shown in Figs. 1 and 2, and comprising a small crank or handle 106 attached to a shaft 107 upon which is secured a driving gear 108 which meshes with an idler gear 109 and the idler gear in turn meshes with a gear 110 which is mounted upon shaft 23 extending to the interior of the casing. These gears are preferably of such a size that it takes two full rotations of the driving gear 108, and consequently of the handle 106 to produce one rotation of the gear 110 and its shaft 23. A spring pressed pawl 111 engages a stop shoulder formed by a recess 112 in a plate 113 associated with the gear 110 so that upon one complete rotation of the shaft 23 it will be resiliently held by the pawl 111 in the proper position for the next actuation and movement of the mechanism. In order to drive the shaft 46, a gear 114 is mounted upon shaft 23 and a gear 115 of equal size meshing therewith is mounted upon shaft 46 so that one rotation of the shaft 23 produces a corresponding rotation of the shaft 46.

Enclosing the gears 108, 109, and 110 is a small casing 116 attached to the outside of the main casing 1 and the crank 106 projects through this casing for rotation by the operator of the machine.

*Operation.*—Assuming that the parts are in their normal positions, and that the money value chart is held in position indicating the money value of a preceding transaction, the first action of the operator, after weighing the article whose value is to be computed, is to adjust the price per pound corresponding thereto by rotation of the handle 27 which sets the disc 29 carrying with it the price per pound indicating wheel 31 having chart 9 visible through the sight openings 4 at opposite sides of the casing in view of the buyer and seller, respectively. Disc 29 is held in place by the toothed disc 28 in position to be engaged by the projection 38 of the money value adjuster 35.

The small handle or crank 106 is then given two rotations which cause the operation of the various mechanisms as described; (1) to release the money value chart by disengaging the extension 97 of the lever 82 which causes it to return under the action of spring 86 until its projection 83 engages the side of its companion lever 81 releasing lever 134 to disengage the tip 130 from the teeth 120 of wheel 80 and releasing the units dog pointed end 158 of lever 157 from the teeth 155 so that these and the other levers restore the dials, thereby returning the money value chart to a zero position; (2) to operate the scale part clamping mechanism by means of lever 21 and cam 22 for engaging the scale part 13 in the position to which it has been moved by the weight placed upon the scale; (3) to extend the stop 51 at the bottom of slide 50 into the path of the scale member 13 which it will engage when the slide 50 is moved downwardly; (4) to move the actuator 35 until its stop 38 engages the price per pound disc 29 in whatever position it may be set, by means of the arm 41 and its extension 43 which is controlled by the cam 45 and thereby to set the arm 32 at an angular position determined by the movement of the adjuster 35; (5) to move the slide 50 downwardly until its stop 51 engages the scale part 13 by means of the rack and pinion connection between the slide 50 and its operating segment 62 which is controlled by cam 68, the slide carrying with it the arm 32 which maintains the angular position to which it has been set by the adjuster 35; (6) to move the money value slide 73 a distance to the right, as viewed in Fig. 5, which is determined by the angular adjustment of the arm 32 and the downward movement of the arm with the slide 50; (7) to move the money value wheel and its chart 8 by the operation of the lever 82; (8) to provide a differential adjustment of the money value chart; (9) to again clamp the money value chart which now indicates through the sight openings the correct money value for the article weighed at the indicated price per pound; and (10) to return all the parts actuated by the crank 106 and its associated mechanism, (except releasing the money value chart) to their normal or zero positions as shown in the drawings, the price per pound mechanism also remaining at the price for which it is set until positively adjusted by the handle 27 to another setting. The obvious reason for this is that the next article to be weighed may be sold at the same price per pound.

Figure 11:
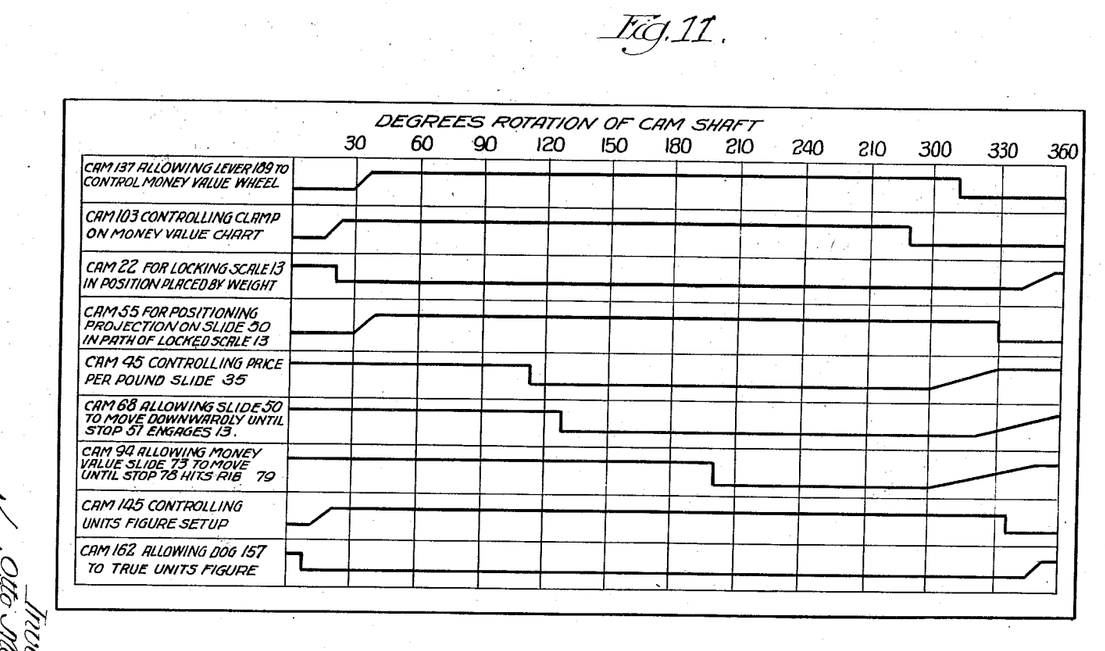
Fig. 11 is a timing diagram of the operation.

In order that the operations of the various parts may be accurately compared and timed, reference may be had to the chart or diagram in Fig. 11 showing the comparative relation of the movement of the various cams which are mounted upon the actuating cam shaft 23 and are moved by it one complete rotation or 360° for each movement of the computing scale. The high portion of each line of the chart shows the period of operation and the low portion shows the period of release or disconnection. The cams operate the parts abruptly or gradually as indicated by the sharp or more gradual connecting lines between the high and low portions thereof.

Thus the cycle of operations is complete, and the only action necessary by the operator of the mechanism is to set the price per pound dial and to turn the small handle 106 a predetermined amount in the same direction. It is found better to give this handle two complete rotations rather than a single one as it gives the mechanism operated thereby a longer time interval and the action is similar to recording registers with which many clerks are now familiar.

With this mechanism a cumbersome drum or dial or a series of charts are entirely avoided and a single chart or dial is substituted for all weights and prices per pound within the limit of the mechanism. For example, the present design is intended for prices ranging up to one dollar per pound and for weights up to twenty pounds, although it is obvious that any limits and values can be taken care of by the same or a similar mechanism. It is found furthermore that the numerals upon the charts are sufficiently large to be clearly seen through the sight openings and by having magnifying lenses, the numerals opposite the centers of the sight openings are made large and clearly visible from a considerable distance and at various angles not in direct line with the axis of the lenses.

As there is no lost motion either in the setting of the arm 32 or in the vertical movement of the slide 50 the money value movement of the chart is positive and accurate and there is no error in the setting or movement of the money value scale which is positively held and locked in place even after the transaction is complete and the weight is removed from the scale so that a customer can see by looking at the money value chart whether he has been given the proper change in completing the transaction.

It is obvious that various changes may be made in the construction, combination and arrangement of the several parts without departing from the spirit and scope of the invention.

I claim:

1. In a computing scale, a money value chart and means for varying the movement of the chart in accordance with the price per pound and the weight, said means comprising a graduated, rotatable price variation disc, an adjuster movable to engage a graduation thereof, an arm movable in accordance with the position of the adjuster at an angle proportionate to the variation in price, means for moving the arm bodily a distance depending upon the weight, and mechanism operating in a constant path for engaging the arm in its final position as determined by the two adjustments thereof for varying the money value in accordance therewith.

2. In a mechanism for registering the money value determined by the price per pound and the weight of an article, a disc having a spiral toothed surface and movable to indicate one of the variables, an adjuster movable to engage the toothed surface in the position set, a member moved by the adjuster in accordance with the position of the disc, a slide to bodily move the member at right angles to the movement of the adjuster a distance depending upon the other variables, and mechanism for rotating a money value indicator different distances as determined by the movement of the adjuster and the slide.

3. In a computing scale of the class described, a price per pound mechanism comprising a single graduated disc and an adjuster engageable with the disc graduations and relatively movable in accordance with the price per pound adjustment, a slide movable at right angles to the adjuster a distance determined by the weight of the articles, and mechanism for combining the price per pound and weight movements in proportion to their variations and transferring the movements to a money value chart having prices thereon in accordance with such movements.

4. In a computing scale of the class described, a money value chart and means for variably operating the chart, said means comprising a pair of levers rotatable together in moving the money value chart, means for locking one of the levers and the chart in the money value indicating position, and a resilient connection between the levers for permitting the other lever to return to normal position after the money value chart is locked.

5. In a money value scale a rotatable indicating chart, a slide for determining the movement of the chart, means for moving the slide and chart in unison in one direction, said means comprising a pair of actuating levers one of which has a projection engaged by the other, locking means for engaging one of the levers and holding the chart in a money value indicating position, means for returning the other lever to normal position, and means for bringing the levers together in normal position when the locking means is released.

6. In a computing scale, a money value chart, means including a single variable price per pound disc and actuating levers for varying the movement of the chart in accordance with the price per pound and the weight, locking mechanism for holding the money value chart in a money value indicating position, and cam operated means for returning the levers of the chart varying mechanism to normal position for the next variable movement of the money value chart.

7. A computing scale having a money value chart, a price per pound adjuster, weight indicating mechanism, means comprising a pair of cooperating levers for varying the reading of the money value chart in accordance with the position of the price per pound adjuster and the weight indicating mechanism, and actuating mechanism for first releasing the money value chart from a former setting, for next positioning the weight indicating mechanism in accordance with the weight of an article to be priced, and thereafter moving the money value indicating chart to a corresponding new position determined by the weight and the price per pound, and then returning the operating parts including said levers to normal position, said normal position also including the locking of the money value chart in a position indicating the last price per pound determination.

8. In a computing scale, a money value indicator, a price per pound mechanism, a weight mechanism, an adjuster for moving the money value indicator in accordance with the price per pound and the weight of an article, the money value indicator including a tens indicator chart, a units indicator chart arranged adjacent thereto, a differential mechanism connecting the charts and operating them reversely, means for engaging the tens chart and operating it reversely to accurately indicate the next lower tens stop, said reverse movement operating through the differential mechanism to accurately position the units chart to correspond with the amount of reverse movement of the tens chart.

9. A computing scale mechanism comprising a price per pound mechanism, a money value chart, means for varying the movement of the chart in accordance with the price per pound and the weight of an article, the money value chart comprising a units dial and a tens dial, a differential mechanism connecting them reversely and indicating the money value determined by the price per pound and the weight, the money value dials comprising the chart having oppositely disposed numerals visible at opposite sides of the scale with separate units indicators at opposite sides thereof, and the adjusting movement imparted to one of the units charts being correspondingly imparted to the other one so that the money value indication will be the same at both sides of the scale.

10. A computing scale mechanism comprising a money value chart having a units dial, and a dial with tens graduations, means for actuating the dials and holding them at set values, said actuating means including a mechanism for differentially moving the units dial reversely to the tens dial, the differential mechanism comprising means for moving the tens dial approximately to the next higher graduation when the units dial registers more than nine and one-half units.

11. A computing scale mechanism comprising a money value chart having a units dial and a dial with tens graduations, means for actuating the dials and holding them at set values, said actuating means including differential mechanism for reversely moving the units and tens dials, and the units dial having a toothed holding portion and a pawl for engaging the teeth to indicate on the dial the nearest unit for any computation between the units, the differential mechanism comprising a separable connection for restoring the tens dial approximately to the next higher graduation when the units dial registers more than nine and one-half units.

12. A computing scale mechanism comprising a money value chart having a units dial, a tens dial with corresponding graduations, means for imparting movement to the dials and holding them at set values; differential mechanism for moving the dials, the units dial having a holding portion with angular teeth, a pawl to engage the teeth, a gear forming part of the actuating means, and a yielding connection between the gear and the dial, the engagement of the pawl with the teeth causing a yielding movement of the dial to set it at the nearest unit.

13. A computing scale mechanism comprising a money value chart having a units dial, a tens dial with corresponding graduations, means for imparting movement to the dials and holding them at set values, differential mechanism for additionally moving the dials including a rocking lever and an actuator for the units dial, and means including a separable connection tending to hold them together for normal units actuation.

14. Mechanism in accordance with claim 13, in which the units dial has an actuating gear, and means engageable with the said actuator for breaking the separable connection and moving the dials at a predetermined units dial condition.

15. Computing scale mechanism in accordance with claim 13 in which the units dial has an actuating gear with a knock-out projection for breaking the separable connection when the dial registers more than 9½ units, and means for thereupon moving the said rocking lever to return the units dial to zero and the tens dial to its former position, the dial holding means being then set approximately at the next tens dial graduation.

16. A computing device comprising parts having tens graduations and units graduations, reversely operating differential mechanism connecting the parts whereby the movement of the units part is dependent for its movement below nine and one-half units upon the movement of the tens part, and automatic releasing mechanism between the parts whereby the tens part is restored approximately to the next higher graduation when the units part registers more than nine and one-half units.

17. A computing scale mechanism comprising a money value chart having a units dial, a tens dial with corresponding graduations, means for imparting movement to the tens dial, mechanism connecting the dials for imparting reverse movement of one in proportion to the movement of the other, and for holding them at set values, said mechanism including a rocking lever and an actuator for the units dial and means including a separable connection tending to hold the lever and actuator together for normal units actuation.

18. A computing scale mechanism comprising a money value chart having a units dial, a tens dial with corresponding graduations, means for imparting movement to the tens dial, reversely operating mechanism for connecting the units and the tens dials and holding them at set values, said mechanism including a lever and an actuator with a separable connection tending to hold them together for normal unit operation, and means including an actuating gear which includes a knock-out projection and a rocking lever for breaking the separable connection when the units dial registers more than nine and one-half units.

19. A computing device comprising parts having tens graduations and units graduations, mechanism connecting the parts for reverse operation whereby the movement of the units part is dependent upon that of the tens part below nine and one-half units, and automatic releasing mechanism between the parts when the units part registers more than nine and one-half units, allowing the tens and units parts to return to the position they occupied before the reverse movement.

20. In a computing device, a weighing mechanism, a price per pound mechanism, a money value chart, means for varying the movement of the chart in accordance with the price per pound and the weight of an article, the money value chart comprising a ten cent graduation dial and a units dial, means for operating the ten cent dial from a zero position to the position representing a value reading of tens and units, mechanism for connecting the tens and units dials for operating the units dial to receive the units reading as said tens dial is returned to the next lower tens value, and means causing said mechanism to return the units dial to zero and the tens dial substantially to its next higher tens graduation when the units dial is moved by said tens dial to indicate more than nine and one-half units.

21. In a device for exhibiting values composed of more than one order, at least two graduated members for exhibiting values in terms of major and minor units, means for operating the graduated member for major units in accordance with a value to be exhibited and representing major and minor units, and subsequently acting means controlled by said graduated member for major units adapted to operate the graduated member for minor units in accordance with the amount by which the value to be exhibited exceeds the largest number of major units contained in it, said last means also including automatic releasing mechanism between the members to permit movement of the major unit member to exhibit substantially the next higher major unit when the graduated member for minor units has been operated to read less than a half of one unit below the amount indicated by the said next higher reading of the major unit member.

OTTO MALCHER.